US009922434B2

(12) United States Patent
Zhu et al.

(10) Patent No.: US 9,922,434 B2
(45) Date of Patent: Mar. 20, 2018

(54) METHOD FOR PRESENTING DATA AND DEVICE THEREOF

(71) Applicant: Tencent Technology (Shenzhen) Company Limited, Shenzhen (CN)

(72) Inventors: Haiyang Zhu, Shenzhen (CN); Jiang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 25 days.

(21) Appl. No.: 14/495,347

(22) Filed: Sep. 24, 2014

(65) Prior Publication Data

US 2015/0015584 A1    Jan. 15, 2015

Related U.S. Application Data

(63) Continuation of application No. PCT/CN2014/080305, filed on Jun. 19, 2014.

(30) Foreign Application Priority Data

Jul. 12, 2013  (CN) .......................... 2013 1 0293579

(51) Int. Cl.
G06T 11/20   (2006.01)
G06T 13/80   (2011.01)

(52) U.S. Cl.
CPC ............ *G06T 11/206* (2013.01); *G06T 13/80* (2013.01)

(58) Field of Classification Search
CPC ............................. G06T 11/206; G06T 13/80
See application file for complete search history.

(56) References Cited

U.S. PATENT DOCUMENTS

| 7,120,687 B1 * | 10/2006 | Tessman, Jr. ....... G06F 21/6209 709/224 |
| 2013/0069946 A1 * | 3/2013 | Venon ...................... A61B 5/00 345/428 |
| 2013/0076755 A1 * | 3/2013 | Pritting ................... G06T 13/00 345/473 |
| 2013/0076756 A1 * | 3/2013 | Pritting ................... G06T 13/00 345/473 |

(Continued)

FOREIGN PATENT DOCUMENTS

| CN | 101430710 A | 5/2009 |
| CN | 101448120 A | 6/2009 |
| CN | 102682463 A | 9/2012 |

OTHER PUBLICATIONS

International Search Report for corresponding PCT application No. PCT/CN2014/080305, dated Sep. 29, 2014, 4p.

*Primary Examiner* — Tapas Mazumder
(74) *Attorney, Agent, or Firm* — Anova Law Group, PLLC (57) ABSTRACT

A method for presenting data and device thereof related to the field of information technology are provided, to improve a presenting efficiency for data and reduce operational complexity for a user. The method includes: firstly obtaining data to be presented; then allocating corresponding initialization playing parameters for the data; formatting, after a playing trigger instruction for the data is received, data corresponding to each frame based on the data formatting function, to generate visualization data corresponding to each frame; finally continuously playing the visualization data corresponding to each frame in sequence from the playing start frame.

12 Claims, 4 Drawing Sheets

(56) References Cited

U.S. PATENT DOCUMENTS

2013/0083049 A1\* 4/2013 Mizuno ............ G06F 17/30265
　　　　　　　　　　　　　　　　　　　345/581
2014/0006920 A1\* 1/2014 Li ..................... G06F 17/241
　　　　　　　　　　　　　　　　　　　715/230

\* cited by examiner

METHOD FOR PRESENTING DATA AND DEVICE THEREOF

CROSS REFERENCE

This application is a continuation application of International Application No. PCT/CN2014/080305, titled "Method for presenting data and device thereof", filed on Jun. 19, 2014, which claims priority to Chinese patent application No. 201310293579.0 titled "Method for presenting data and device thereof" and filed with the State Intellectual Property Office on Jul. 12, 2013, which are incorporated herein by reference in their entireties.

FIELD OF THE TECHNOLOGY

The disclosure relates to the field of information technology, and in particular to a method for presenting data and a device thereof.

BACKGROUND OF THE DISCLOSURE

With the continuous development of the network technology, more and more services are provided to a user on the network. Performance of a certain service is reflected by counting data during a process for providing services to the user by the service. In the case of counting data for a certain service, generally data of different dimensions or data in respective periods in each day within a range of dates for the certain service is obtained, and then the obtained data is presented.

Presently, a date or a dimension for data to be presented may be input manually in data presenting, i.e., a date or a dimension for data to be presented is needed to be input each time switching is performed between data with different dates or different dimensions. In this case, the terminal device can display the corresponding data based on the newly input date or dimension, thereby resulting in a low presenting efficiency for data at present.

SUMMARY OF THE DISCLOSURE

According to embodiments of the disclosure, a method for presenting data and a device thereof are provided, to improve a presenting efficiency for data. A method for presenting data may include: obtaining data to be presented, allocating corresponding initialization playing parameters for the data, wherein the initialization playing parameters include a playing start frame, data corresponding to each frame and a data formatting function, wherein the data corresponding to each frame is obtained from the data to be presented, receiving a playing trigger instruction for the data, formatting, based on the data formatting function, the data corresponding to each frame, to generate visualization data corresponding to the frame, and continuously playing the visualization data corresponding to each frame in sequence from the playing start frame.

An device for presenting data may include: an obtaining unit, configured to obtain data to be presented, an allocating unit, configured to allocate corresponding initialization playing parameters for the data obtained by the obtaining unit, wherein the initialization playing parameters include a playing start frame, data corresponding to each frame and a data formatting function, wherein the data corresponding to each frame is obtained from the data to be presented, a receiving unit, configured to receive a playing trigger instruction for the data, a generating unit, configured to format, after the playing trigger instruction for the data is received by the receiving unit, the data corresponding to each frame based on the data formatting function configured by the allocating unit, to generate visualization data corresponding to each frame, and a playing unit, configured to continuously play the visualization data corresponding to each frame in sequence, which is generated by the generating unit, from the playing start frame.

According to the method for presenting data and the device thereof provided by the embodiments of the invention, firstly data to be presented is obtained, and then corresponding initialization playing parameters are allocated for the data. After a playing trigger instruction for the data is received, data corresponding to each frame is formatted based on the data formatting function, to generate visualization data corresponding to each frame. Finally the visualization data corresponding to each frame is continuously played in sequence from the playing start frame. But in the conventional technology, a date or a dimension of data to be presented is needed to be input manually when performing data presentation, i.e., a date or a dimension of data to be presented is needed to be manually input each time switching is performed between data with different dates or different dimensions. Compared with the conventional technology, according to the embodiments of the invention, data with different dates or different dimensions may be presented continuously and automatically by a way of playing data, thereby a presenting efficiency for data is improved and the number of interactions between the terminal device and the user is reduced during a process for presenting data with different dates or different dimensions, thereby system resource is saved.

BRIEF DESCRIPTION OF THE DRAWINGS

In order to illustrate the technical solutions in the embodiments of the invention more clearly, the accompanying drawings for the description of the embodiments or the conventional technology will be introduced simply hereinafter. Obviously, the following described accompanying drawings are only some embodiments of the invention, other accompanying drawings may be obtained according to these accompanying drawings by those skilled in the art without any creative work.

DETAILED DESCRIPTION OF THE DISCLOSURE

Hereinafter the technical solutions in the embodiments of the invention will be described clearly and completely in conjunction with the accompanying drawings in the embodiments of the invention. Obviously, the described embodiments are only some of the embodiments of the invention, not all the embodiments. Based on the embodiments of the invention, all of the other embodiments obtained by those skilled in the art without any creative wok fall within the scope of the present disclosure.

In order to make advantages of the technical solutions of the disclosure more clearly, hereinafter the disclosure will be illustrated in detail in conjunction with the accompanying drawings and the embodiments.

Figure 1:
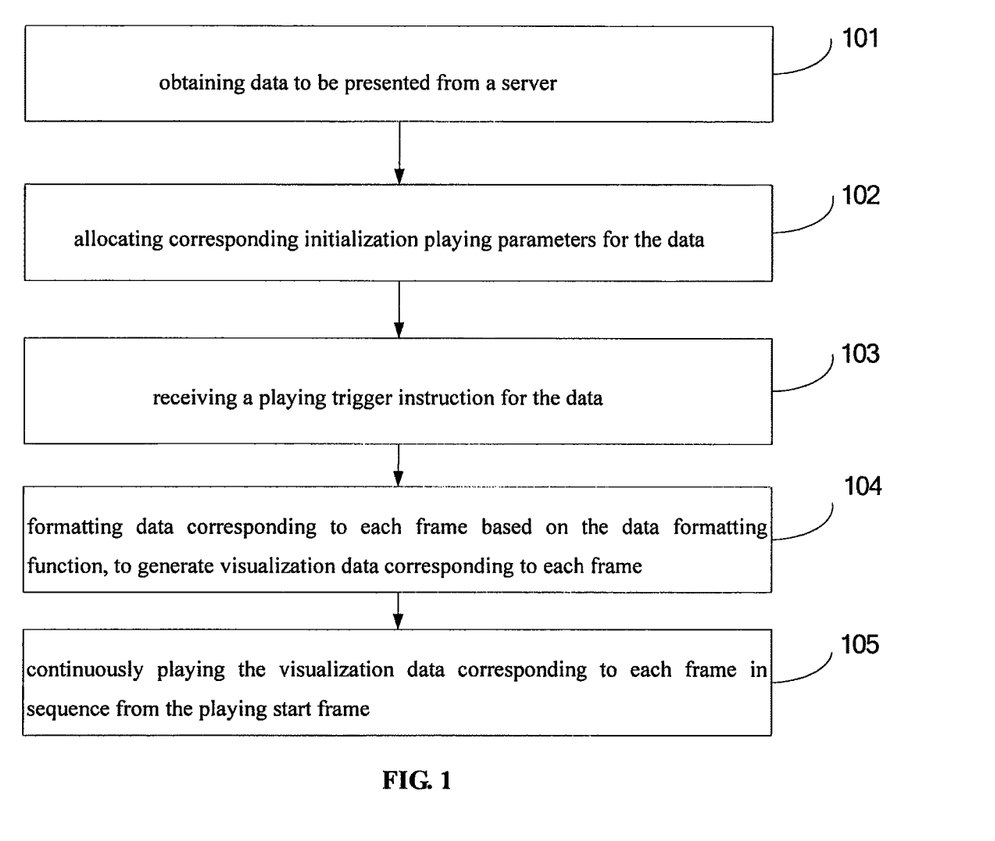
FIG. 1 is a flow chart of a method for presenting data according to an embodiment of the invention.

According to an embodiment of the invention, there is provided a method for presenting data, as shown in FIG. 1, the method includes steps as follows.

In step 101, data to be presented is obtained from a server.

The data may be one or more pieces of data of a certain service at respective periods in each day within a range of successive dates, or may be data for each dimension of a certain service at a period, which is not defined by the embodiment of the invention. Different dimensions of a certain service may be different index information corresponding to the certain service.

Specifically, a client device sends a data obtaining request to a server preserving data at first to obtain data that is needed. After receiving the data obtaining request, the server feedbacks the data needed for playing this time to the client device, the data may be of a format of JavaScript Object Notation (JSON). After receiving the data, the client device parses the JSON format into an identifiable format, for example, in java script language, data of the JSON format is transformed into a java script array, which is not defined by the embodiment of the invention.

In step 102, initialization playing parameters are allocated for the data.

The initialization playing parameters may include a playing start frame, data corresponding to each frame and a data formatting function. Data may be formatted based on the data formatting function, to generate visualization data corresponding to data such as a line chart, a table, thereby further improving a presenting effect for the data. Different formatting processing ways correspond to different data formatting functions, the data formatting function, which formats the data as a type of visualization data, may be configured based on the type of visualization data to be generated finally.

In step 103, a playing trigger instruction for the data is received.

A playing trigger region may be configured beforehand in a screen interface, and it is instructed to play data as a user performs a clicking or a touch operation in the playing trigger region. In addition, a preset graph corresponding to the playing trigger instruction may also be displayed in the playing trigger region, and it is instructed to play data as a user performs a clicking or a touch operation on the preset graph.

In step 104, the data corresponding to each frame is formatted based on the data formatting function, to generate visualization data corresponding to each frame.

The visualization data may be visualization graphic data such as a line chart, a curve, or it may be visual data such as a table, a bar chart.

In step 105, the visualization data corresponding to each frame is continuously played in sequence from the playing start frame.

In the embodiment of the invention, the frame length for each frame may be configured based on actual need, for example, the frame length may be configured as 2 s, 3 s, etc, which is not defined by the embodiment of the invention. The frame length for each frame is the displaying time length for data corresponding to each frame.

According to the method for presenting data provided by the embodiment of the invention, firstly data to be presented is obtained from a server, and then corresponding initialization playing parameters are allocated for the data. After a playing trigger instruction for the data is received, data corresponding to each frame is formatted based on the data formatting function, to generate visualization data corresponding to each frame. Finally the visualization data corresponding to each frame is continuously played in sequence from the playing start frame. In the conventional technology, a date or a dimension of data to be presented is needed to be input manually when performing data presenting, i.e., a date or a dimension of data to be presented is needed to be manually input each time switching is performed between data with different dates or different dimensions; compared with the conventional technology, according to the embodiment of the invention, data with different dates or different dimensions may be presented continuously and automatically by a way of playing data, thereby a presenting efficiency for data is improved and the number of interactions between the terminal device and the user is reduced during a process for presenting data with different dates or different dimensions, and thereby system resource is saved.

Figure 2:
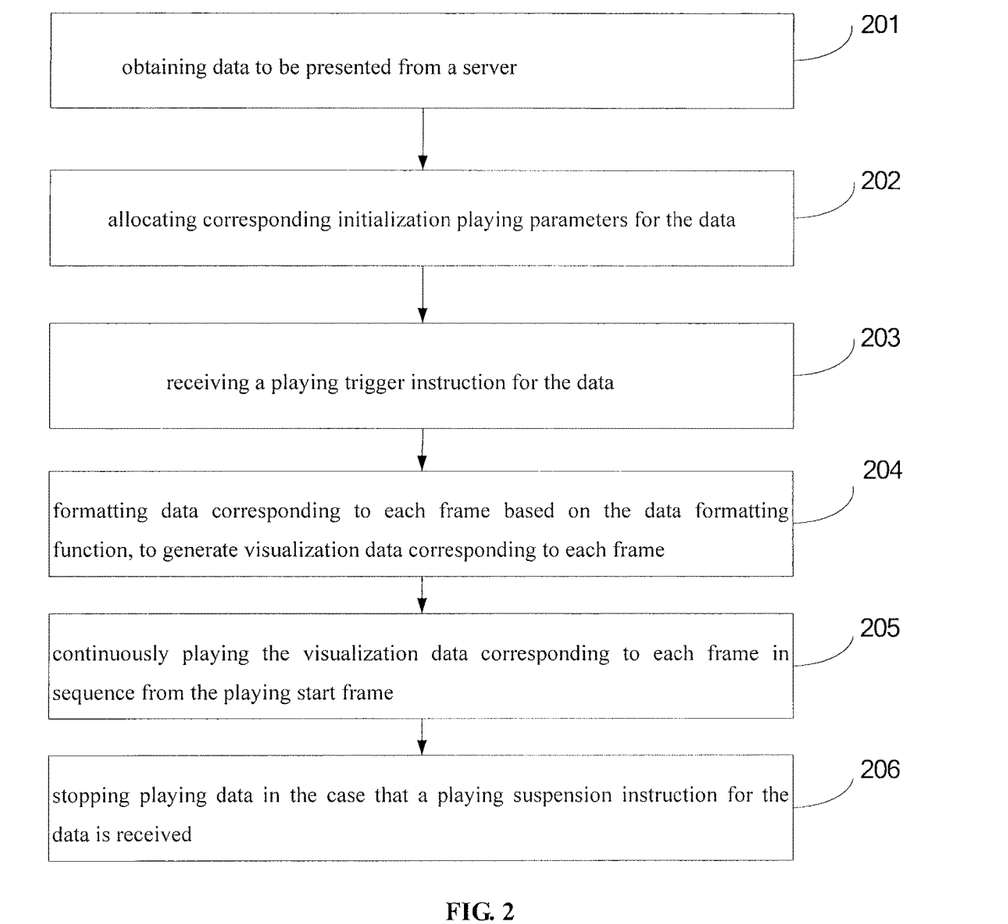
FIG. 2 is a flow chart of another method for presenting data according to an embodiment of the invention.

According to an embodiment of the disclosure, there is provided another method for presenting data, as shown in FIG. 2, the method may include the steps as follows.

In step 201, data to be presented is obtained.

The data may be one or more pieces of data of a certain service at different periods in each day within a range of successive dates, or may be data for all dimensions of a certain service at a period, which is not defined by the embodiment of the invention. Different dimensions of a certain service may be different index information corresponding to the service.

Step 201 may include: data in different periods in each day during preset successive dates to be played is obtained. In this case, a playing start frame included in the initialization playing parameters is a playing frame corresponding to a playing start date, data corresponding to each frame included in the initialization playing parameters is data in different periods of the day corresponding to a date to which the frame belongs.

For example, the preset successive dates are from June 1st to June 30th, in this case the playing start frame is a playing frame corresponding to June 1st; and from June 1st, one playing frame is allocated for each date in sequence based on an order of the date, i.e., 30 playing frames are needed to be allocated in total. In this case, data corresponding to each frame is data in different periods in the day corresponding to a date to which the frame belongs. In addition, data associative information such as a data index level corresponding to the data may also be obtained when obtaining data in different periods in the day corresponding to a date to which each frame belongs, such that the data associative information is displayed in a subsequent playing process, thereby information on data to be played and presented is diversified.

Alternatively, step 201 may include: data for each dimension of different dimensions to be played is obtained form the server. The playing start frame is a playing frame corresponding to a playing start dimension, data corresponding to each frame is data for a dimension to which the playing frame belongs. Wherein the number of playing frames to be configured is equal to the number of dimensions. For example, data for 5 dimensions needs to be played, in this case 5 playing frames are needed to be configured, and then visualization data for a dimension corresponding to each frame is played in sequence based on a preconfigured playing order for data of 5 dimensions. In addition, data to be played for each dimension of different dimensions in different application scenarios may also be obtained, thereby enabling information on data to be played and presented in more detail. For the embodiment of the invention, data for different dimensions in respective periods in each day during preset successive dates may also be obtained, thereby enabling data played and presented in the embodiment of the invention to be in more detail and complete.

According to the embodiment of the invention, a client device firstly sends a data obtaining request to a server preserving data at first to obtain data that is needed. In a case that the data to be obtained is data in different periods in each day during preset successive dates, the data obtaining request will carry date information, such that the server obtains data in different periods in each day corresponding to respective date based on the date information and feedbacks the data to the client device. In a case that data to be obtained is data for different dimensions, the data obtaining request will carry dimension information, such that the server obtains data for each dimension of different dimensions indicated in the dimension information based on the dimension information and feedbacks the data to the client device.

In step 202, corresponding initialization playing parameters are allocated for the data.

The initialization playing parameters include a playing start frame, data corresponding to each frame and a data formatting function. Data may be formatted based on the data formatting function, to generate visualization data corresponding to data such as a line chart, a table, thereby improving a presenting effect for data. Different formatting processing ways correspond to different data formatting functions, the data formatting function, which formats the data as a type of visualization data, may be configured based on the type of visualization data to be generated finally.

According to the embodiment of the invention, data may be obtained and loaded in a real time manner during a playing process. The playing process may include: firstly a storage path of data to be presented is obtained, then corresponding initialization playing parameters are allocated for the data, the initialization playing parameters include a playing start frame, a storage path of data corresponding to each frame and a data formatting function; when a playing trigger instruction is received, data corresponding to the current playing frame is obtained in a real time manner from the server based on the storage path of data corresponding to each frame; then the obtained data is formatted based on the data formatting function to generate visualization data, thereby the frame is played and displayed.

In step 203, a playing trigger instruction for the data is received.

A playing trigger region may be configured in a screen interface in advance. It is instructed to play data when a user performs a clicking or touch operation in the region. In addition, a preset graph corresponding to the playing trigger instruction may be displayed in the playing trigger region. It is instructed to play data when a user performs a clicking or touch operation on the preset graph.

In step 204, the data corresponding to each frame is formatted based on the data formatting function, to generate visualization data corresponding to each frame.

The visualization data may be visualization graphic data such as a line chart, a curve, or it may be visual data such as a table, a bar chart.

In step 205, the visualization data corresponding to each frame is continuously played in sequence from the playing start frame.

For the embodiment of the invention, the frame length for each frame may be configured based on the actual need, for example, the frame length is configured as 2 s, 3 s, etc, which is not defined by the embodiment of the invention. The frame length for each frame is the displaying time length for data corresponding to each frame.

In a case that the obtained data is data in different periods in each day during preset successive dates, visualization data in different periods in the day corresponding to each frame is continuously played in sequence from a playing frame corresponding to the playing start date and a date to which the current frame belongs is displayed.

Alternatively, in a case that the obtained data is data for each dimension of different dimensions, visualization data in one dimension corresponding to each frame is continuously played in sequence from a playing frame corresponding to the playing start dimension and a dimension to which the current frame belongs is displayed.

For the embodiment of the invention, a position for displaying visualization data corresponding to each frame may be located above, below, on the left or on the right of a frame playing progress bar, which is not defined by the embodiment of the invention. A position of the frame playing progress bar will be adjusted adaptively based on the displaying position of the visualization data. In addition, a date or a dimension to which the current frame belongs may also be displayed on the frame playing progress bar.

In step 206, data playing is stopped when a playing suspension instruction for the data is received.

A trigger region for the playing suspension instruction is the same as that for the playing trigger instruction. Specifically, different trigger graphs are displayed in the trigger region to prompt a user whether the current data is in a playing state or in a suspension state.

For the embodiment of the invention, visualization data corresponding to any frame may be displayed based on a playing jump instruction for data. The displaying process may include: firstly a playing jump instruction for the data is received, the playing jump instruction is configured to indicate a target frame to be played next; then data corresponding to the target frame is obtained; finally visualization data for data corresponding to each frame after the target frame is continuously played in sequence from the target frame, or visualization data for data corresponding to the target frame is displayed. The user may perform a dragging operation on a frame playing progress bar to instruct a position of a certain frame to be displayed.

Figure 5:
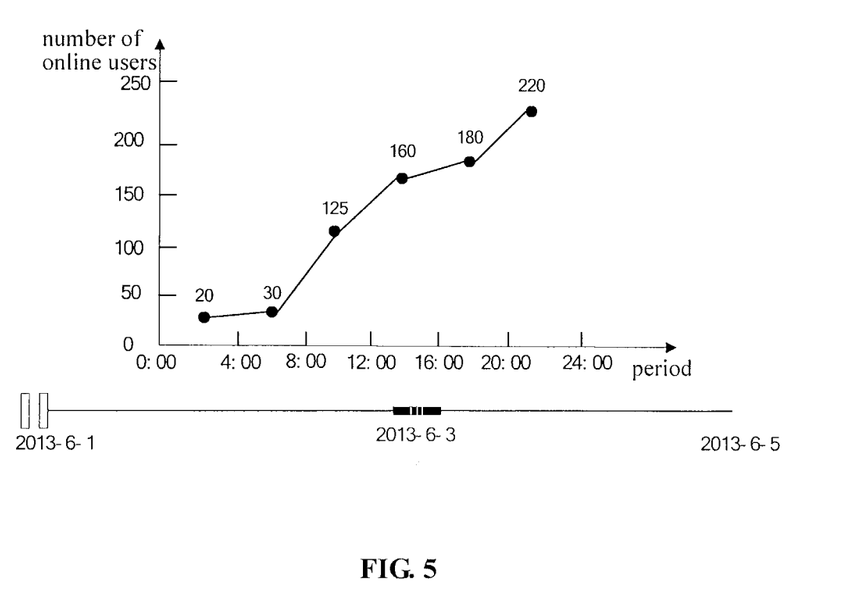
FIG. 5 is a schematic diagram illustrating playing and presenting according to an embodiment of the invention.

For the embodiment of the invention, the specific application scenario may be illustrated as follows but not limited thereto, the specific application scenario includes: in a case that data to be presented is data about the number of online users in respective periods on each day from June 1st to June 5th, firstly data about the number of online users in respective periods on each day from June 1st to June 5th is obtained from a server; then data corresponding to a playing start frame is configured as data about the number of online users in respective periods on June 1st; then data corresponding to a second playing frame is configured as data about the number of online users in respective periods on June 2nd, and so on, 5 playing frames are generated and the data formatting function is configured. When a playing trigger instruction is received from a user, data about the number of online users in respective periods corresponding to each frame is formatted based on the data formatting function, to generate visualization data corresponding to each frame; then visualization data corresponding to each frame is played in sequence from a playing frame corresponding to June 1st, thereby it is achieved that data corresponding to different dates is displayed continuously and automatically, thereby a presenting efficiency for data is improved. FIG. 5 is a schematic diagram illustrating a case when a playing frame corresponding to June 3rd is played, and FIG. 5 shows visualization data for data about the number of online users in respective periods on June 3rd.

According to another method for presenting data provided by the embodiment of the invention, firstly data to be presented is obtained, and then corresponding initialization playing parameters are allocated for the data. After a playing trigger instruction for the data is received, data corresponding to each frame is formatted based on the data formatting function, to generate visualization data corresponding to each frame. Finally the visualization data corresponding to each frame is continuously played in sequence from the playing start frame. In the conventional technology, a date or a dimension of data to be presented is needed to be input manually when performing data presenting, i.e., a date or a dimension of data to be presented is needed to be manually input each time switching is performed between data with different dates or different dimensions; compared with the conventional technology, according to the embodiments of the invention, data with different dates or different dimensions may be presented continuously and automatically by way of playing data, thereby a presenting efficiency for data is improved and the number of interactions between the terminal device and the user is reduced during a process for presenting data with different dates or different dimensions, thereby system resource is saved.

Figure 3:
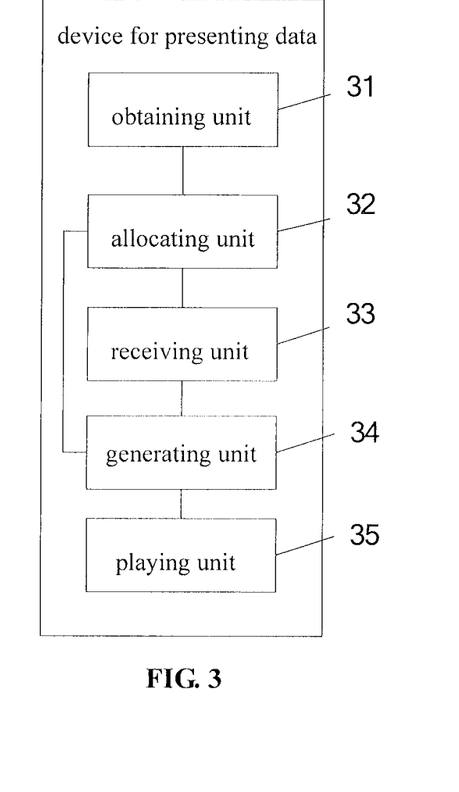
FIG. 3 is a schematic structural diagram of an device for presenting data according to an embodiment of the invention.

Furthermore, as a specific implementation way for the method shown in FIG. 1, a device for presenting data is provided according to an embodiment of the invention. As shown in FIG. 3, an entity of the device may be a terminal device, such as a mobile phone, a computer, a notebook computer. The device includes an obtaining unit 31, an allocating unit 32, a receiving unit 33, a generating unit 34, and a playing unit 35. The program instructions corresponding to the units are stored in a medium of the device, and may be executed by at least one processor in the device.

The obtaining unit 31 may be configured to obtain data to be presented.

The allocating unit 32 may be configured to allocate corresponding initialization playing parameters for the data obtained by the obtaining unit 31, and the initialization playing parameters include a playing start frame, data corresponding to each frame and a data formatting function.

The receiving unit 33 may be configured to receive a playing trigger instruction for the data.

The generating unit 34 may be configured to format, after the playing trigger instruction for the data is received by the receiving unit 33, the data corresponding to each frame based on the data formatting function configured by the allocating unit 32, to generate visualization data corresponding to each frame.

The playing unit 35 may be configured to continuously play the visualization data corresponding to each frame in sequence, which is generated by the generating unit, from the playing start frame.

It should be noted that, for other descriptions for respective functional unit included in the device provided by the embodiment of the invention, one may refer to the corresponding descriptions in conjunction with FIG. 1, which is not described here.

Figure 4:
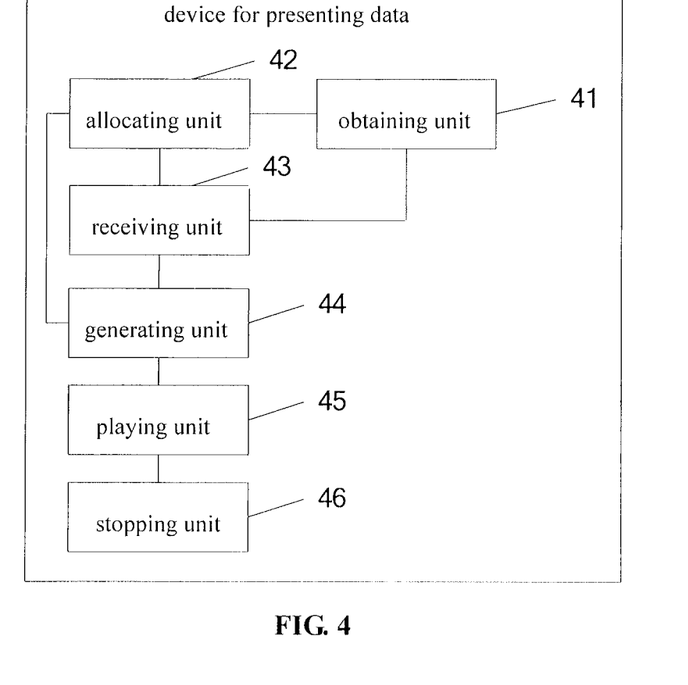
FIG. 4 is a schematic structural diagram of another device for presenting data according to an embodiment of the invention.

Furthermore, as a specific implementing way for the method shown in FIG. 2, another device for presenting data is provided according to an embodiment of the invention. As shown in FIG. 4, an entity of the device may be a terminal device, such as a mobile phone, a computer, a notebook computer. The device includes an obtaining unit 41, an allocating unit 42, a receiving unit 43, a generating unit 44, a playing unit 45 and a stopping unit 46.

The obtaining unit 41 may be configured to obtain data to be presented.

The allocating unit 42 may be configured to allocate initialization playing parameters for the data obtained by the obtaining unit 41, and the initialization playing parameters include a playing start frame, data corresponding to each frame and a data formatting function.

The receiving unit 43 may be configured to receive a playing trigger instruction for the data.

The generating unit 44 may be configured to format, after a playing trigger instruction for the data is received by the receiving unit 43, data corresponding to each frame based on the data formatting function configured by the allocating unit 42, to generate visualization data corresponding to each frame.

The playing unit 45 may be configured to continuously play the visualization data corresponding to each frame in sequence, which is generated by the generating unit, from the playing start frame.

The obtaining unit 41 may be configured to: obtain data in each day during preset successive dates to be played from the server, where the playing start frame is a playing frame corresponding to a playing start date, data corresponding to each frame is data in different periods in a day; or obtain data for each dimension of different dimensions to be played from the server, where the playing start frame is a playing frame corresponding to the playing start dimension, data corresponding to each frame is data for each dimension.

The playing unit 45 may be configured to: from a playing frame corresponding to the playing start date, continuously play visualization data in different periods in a day corresponding to each frame in sequence and display a date to which the current frame belongs; or beginning from a playing frame corresponding to the playing start dimension, continuously play visualization data for one dimension corresponding to each frame in sequence and display a dimension to which the current frame belongs.

The receiving unit 43 may be further configured to receive a playing jump instruction for the data, the playing jump instruction is configured to indicate a target frame to be played next.

The obtaining unit 41 may be further configured to obtain data corresponding to the target frame.

The playing unit 45 may be further configured to continuously play visualization data corresponding to each frame after the target frame in sequence from the target frame, or display visualization data corresponding to the target frame.

The device may further include a stopping unit 46.

The stopping unit 46 may be configured to stop playing data in the case that a playing suspension instruction for the data is received.

It should be noted that, for other descriptions for respective functional units included in the device provided by the embodiment of the invention, one may refer to the corresponding description in conjunction with FIG. 2, which is not described here.

According to another device for presenting data provided by the embodiment of the invention, firstly data to be presented is obtained, and then corresponding initialization playing parameters are allocated for the data. After a playing trigger instruction for the data is received, data corresponding to each frame is formatted based on the data formatting function, to generate visualization data corresponding to each frame. Finally the visualization data corresponding to each frame is continuously played in sequence from the playing start frame. In the conventional technology, a date or a dimension of data to be presented is needed to be input manually when performing data presentation, i.e., a date or a dimension of data to be presented is needed to be manually input each time switching is performed between data with different dates or different dimensions; compared with the conventional technology, according to the embodiment of the invention, data with different dates or different dimensions may be displayed continuously and automatically by way of playing data, thereby a presenting efficiency for the data is improved and the number of interactions between the terminal device and the user is reduced during a process for presenting data with different dates or different dimensions, and thereby system resource is saved.

The device for presenting data provided by the embodiment of the invention may implement the method embodiment described above, for implementing a specific function, one may refer to the illustration in the method embodiment, which is not described here. The method for presenting data and the device thereof provided by the embodiments of the invention may apply to the field of information technology, but not limited thereto.

Those skilled in the art may understand that all or part of the flows in the above method embodiment may be achieved by the related hardware instructed by computer programs. The programs may be stored in a computer readable storage medium. In the case of executing the programs, the flows of embodiments in the respective method above are executed. The storage medium may be a magnetic disc, an optical disc, a Read-Only Memory (ROM) or a Random Access Memory (RAM).

The above described are only the specific implementation ways of the disclosure, however, the scope of protection of the disclosure is not limited thereto. Changes or substitutions which may be easily thought of by those skilled in the art within the technical scope disclosed by the disclosure should fall within the scope of protection of the disclosure. Hence, the scope of protection of the disclosure should be based on the scope of protection of the claims.

The invention claimed is:

1. A method for presenting multi-faceted data implemented by a terminal device that includes a processor, the method comprising:
   allocating by the terminal device initialization parameters for visually playing data in frames, wherein the initialization parameters comprise a playing start frame, a storage path of data corresponding to each frame of multiple frames in a server, and a data formatting function;
   receiving by the terminal device a playing trigger instruction for playing the data;
   obtaining, by the terminal device, after receiving the playing trigger instruction, the data corresponding to each frame of the multiple frames from the server in real time based on the storage path of the data corresponding to each frame of the multiple frames, and formatting, by the terminal device, based on the data formatting function, the data corresponding to each frame of the multiple frames, to generate visualization data corresponding to each frame of the multiple frames; and
   continuously playing by the terminal device the visualization data corresponding to each frame of the multiple frames in sequence from the playing start frame,
   wherein different frames correspond to data of different facets of the multi-faceted data, each facet represents a different dimension of multiple dimensions, and obtaining the data corresponding to each frame of the multiple frames comprises obtaining data of corresponding dimension.

2. The method of claim 1, wherein continuously playing the visualization data corresponding to each frame of the multiple frames in sequence comprises:
   continuously playing, from a playing frame corresponding to the playing start facet, visualization data for one facet corresponding to each frame of the multiple frames in sequence, and displaying a facet to which the current frame belongs.

3. The method of claim 1, further comprising:
   receiving a playing jump instruction for the data, wherein the playing jump instruction is configured to indicate a target frame to be played next;
   obtaining data corresponding to the target frame; and
   continuously playing, from the target frame, the visualization data corresponding to each frame of the multiple frames after the target frame in sequence, or displaying visualization data corresponding to the target frame.

4. The method of claim 1, wherein after continuously playing visualization data corresponding to each frame of the multiple frames in sequence, the method further comprises:
   stopping playing data when a playing suspension instruction for the data is received.

5. A device for presenting multi-faceted data, the device comprising:
   memory having instructions stored thereon; and
   one or more processors, when executing the instructions, configured to:
   allocate initialization parameters for visually playing the multi-faceted data in frames, wherein the initialization parameters comprise a playing start frame of multiple frames, a storage path of data corresponding to each frame of multiple frames in a server, and a data formatting function;
   receive a playing trigger instruction for the multi-faceted data;
   after the playing trigger instruction for the data is received, obtain the data corresponding to each frame of the multiple frames from the server in real time based on the storage path of the data corresponding to each frame of the multiple frames, and format the data corresponding to each frame of the multiple frames based on the data formatting function, to generate visualization data corresponding to each frame of the multiple frames; and
   continuously play the visualization data corresponding to each frame of the multiple frames in sequence from the playing start frame,
   wherein different frames correspond to data of different facets of the multi-faceted data, each facet represents a different dimension of multiple dimensions, and obtaining the data corresponding to each frame of the multiple frames comprises obtaining data of corresponding dimension.

6. The device of claim 5, wherein the one or more processors, when executing the instructions to play the visualization data, are configured to:

from a playing frame corresponding to the playing start facet, continuously play visualization data in one facet corresponding to each frame of the multiple frames in sequence, and display the facet to which the current frame belongs.

7. The device of claim 5, wherein the one or more processors, when executing the instructions, are further configured to:
receive a playing jump instruction for the data, the playing jump instruction is configured to indicate a target frame to be played next;
obtain data corresponding to the target frame; and
from the target frame, continuously play the visualization data corresponding to each frame of the multiple frames after the target frame in sequence, or display visualization data corresponding to the target frame.

8. The device according to claim 5, wherein the one or more processor, when executing the instructions, are further configured to:
stop playing data when a playing suspension instruction for the data is received.

9. A non-transitory computer-readable medium containing codes for presenting multi-faceted data, the codes, when being executed by a processor of a terminal device, causing the terminal device to:
allocate initialization parameters for visually playing data in frames, wherein the initialization parameters comprise a playing start frame, a storage path of data corresponding to each frame of the multiple frames in a server, and a data formatting function;
receive a playing trigger instruction for playing the data;
obtain, after receiving the playing trigger instruction, the data corresponding to each frame of the multiple frames from the server in a real time manner based on the storage path of the data corresponding to each frame of the multiple frames, and format, based on the data formatting function, the data corresponding to each frame of the multiple frames, to generate visualization data corresponding to each frame of the multiple frames; and
continuously play the visualization data corresponding to each frame of the multiple frames in sequence from the playing start frame,
wherein different frames correspond to data of different facets of the multi-faceted data for a same time period, each facet represents a different dimension of multiple dimensions, and obtaining the data corresponding to each frame of the multiple frames comprises obtaining data corresponding dimension.

10. The computer-readable medium of claim 9, wherein to continuously play the visualization data corresponding to each frame of the multiple frames in sequence comprises:
continuously play, from a playing frame corresponding to the playing start facet, visualization data for one facet corresponding to each frame of the multiple frames in sequence, and displaying a facet to which the current frame belongs.

11. The computer-readable medium of claim 9, when the codes are executed by the terminal device, further causing the terminal device to:
receive a playing jump instruction for the data, wherein the playing jump instruction is configured to indicate a target frame to be played next;
obtain data corresponding to the target frame; and
continuously play, from the target frame, the visualization data corresponding to each frame of the multiple frames after the target frame in sequence, or displaying visualization data corresponding to the target frame.

12. The computer-readable medium according to claim 9, when the codes are executed by the terminal device, further causing the terminal device to, after continuously playing visualization data corresponding to each frame of the multiple frames in sequence, stop playing data when a playing suspension instruction for the data is received.

* * * * *